United States Patent [19]

Balbo et al.

[11] Patent Number: 5,591,934
[45] Date of Patent: Jan. 7, 1997

[54] BLOCKING PART INSERTABLE IN A BREECH RING FOR PREVENTING TRANSLATION OF A ROD WITHIN THE BREECH RING

[75] Inventors: Patrick Balbo; Philippe Grelat, both of Bourges; Guy Malassenet, Piony; Fabienne Mandereau, Sainte Thorette, all of France

[73] Assignee: Giat Industries, Versailies, France

[21] Appl. No.: 439,381

[22] Filed: May 11, 1995

[51] Int. Cl.⁶ .................................................... F41A 25/02
[52] U.S. Cl. ............................................................ 89/43.01
[58] Field of Search ................................... 89/43.01, 198, 89/199, 42.01, 44.01, 37.05, 37.14, 1.35

[56] References Cited

U.S. PATENT DOCUMENTS

| | | | |
|---|---|---|---|
| 620,360 | 2/1899 | Resow | 89/44.01 |
| 1,333,283 | 3/1920 | Schneider | 89/43.01 |
| 1,447,087 | 2/1923 | Joyce | 89/43.01 |
| 1,561,713 | 11/1925 | Gorton | 89/198 |
| 1,809,741 | 6/1931 | Von Frommer | 89/199 |
| 1,975,236 | 10/1934 | Palmer et al. | 89/198 |
| 2,539,494 | 1/1951 | Summerbell | 89/17 |
| 3,662,648 | 5/1972 | Maillard | 89/44.01 |
| 3,863,542 | 2/1975 | Pierre et al. | 89/37.14 |
| 3,969,982 | 7/1976 | Pier-Amory et al. | 89/37.14 |
| 4,785,711 | 11/1988 | Jackson | 89/43.01 |
| 4,884,914 | 12/1989 | Shultz | 403/118 |
| 5,038,510 | 8/1991 | Duke | 43/4 |
| 5,318,534 | 6/1994 | Williams et al. | 604/97 |

FOREIGN PATENT DOCUMENTS 1098857  2/1961  Germany ............................. 89/42.01

Primary Examiner—Stephen M. Johnson
Attorney, Agent, or Firm—Oliff & Berridge

[57] ABSTRACT

An assembly includes a rod, an element and a blocking part insertable into and removable from the element. The blocking part is arranged to be associated with the element in a first position wherein the blocking part lies in the trajectory of a rod portion of a circumference of the rod, thereby preventing relative translation of the rod. The assembly is arranged so that, as soon as the blocking part occupies the first position, the element supports the blocking part and prevents its movement.

21 Claims, 3 Drawing Sheets

BLOCKING PART INSERTABLE IN A BREECH RING FOR PREVENTING TRANSLATION OF A ROD WITHIN THE BREECH RING

BACKGROUND OF THE INVENTION

The subject of the invention is an assembly comprising an element, a rod that is mobile in axial translation with respect to the element, and a removable blocking part.

The invention is notably aimed at brake or recuperator rods for a weapon, for example a piece of artillery.

On a piece of artillery, when it is desirable to transfer strain from the ordnance to the turret or the top-carriage, it is usually necessary to pass by a recoil mechanism, such as a jack, coupled to the breech ring, in such a manner as to be removable by various devices.

A device is known wherein a flange in the form of a half-shell may be screwed to a side face of the breech ring to hold captive a peg integral with the brake rod.

However, if the end of the rod does not come near to the side faces of the breech ring but comes deep into the ring, a long groove must be cut on the side face of the breech ring in order to achieve this end. This necessarily makes the breech ring more fragile and lighter whereas, on the contrary, it must be heavy and sturdy.

Other devices enable the rod to be fastened to the rear face of the breech ring. For example, a system of indentations enables the end of the rod to be engaged in an opening in the breech ring and to block the rod in translation by a quarter-rotation around its axis.

However, this device is difficult to machine and is therefore expensive, especially if the rod is engaged deep into the breech ring.

A nut mounted on the rod may also be engaged in a coaxial tapping of the breech ring so as to prevent the the movement in translation of the rod. But if the rod is pushed deep into the breech ring, this solution requires such a long assembly and disassembly time that it becomes dissuasive.

These three solutions are therefore not suitably adapted for rods wherein the end penetrates deep into the breech ring. For this reason, one aim of the invention is to propose a solution for the removable fastening of the rod to the breech ring allowing for its quick and easy assembly and disassembly without compromising the solidity or the mass of the breech ring or making the machining difficult to carry out.

SUMMARY OF THE INVENTION

A first aim of the invention is thus an assembly comprising an element, a rod that is mobile in axial translation with respect to the element, and a removable blocking part adjusted so as to be associated with the element in a first position wherein the blocking part lies in the trajectory of a part of the circumference of the rod and prevents relative translation of the rod.

According to the invention, the assembly is characterised in that, as soon as the blocking part occupies the first position, the assembly supports the blocking part and prevents its movement under the action of the rod or the element.

The rod is thereby also immobilized as soon as the blocking part has reached its first position. Specific fastening structure that could complicate machining or increase assembly or disassembly time are therefore not needed in order to immobilize the blocking part once it is in position.

This assembly is perfectly adapted to all devices requiring removable fastening of a sliding rod to an element. Within the scope of artillery, it may be advantageously employed for all configurations of brake or recuperator rods, including in common cases where assembly is carried out by the rear or side faces of the breech ring. Moreover, it is particularly adapted to cases wherein the brake rods are engaged deep into the breech ring.

According to an advantageous version of the invention, the assembly may be arranged to guide the blocking part with respect to the element between the first position and a second position wherein the blocking part may be easily put into place or removed by the user.

Assembly and disassembly of the part is thereby made even easier as the assembly itself ensures the guidance of the part up to the first position and afterwards. The user may therefore carry out the assembly and disassembly operations of the blocking part very quickly and without being afraid of positioning errors.

According to a preferred version of the invention, the guidance of the part takes place in a substantially orthogonal plane to the axis of the rod.

The part being forced to move within this plane, no action by the rod or by the element on the blocking part can cause movement of the blocking part such that the part effectively blocks the rod with respect to the element as soon as it is in position. Naturally, the afore-mentioned is only one possible embodiment of the invention. Moreover, the guidance of the part may be implemented by simple and conventional structure enabling the instant installation and removal of the blocking part.

According to a further advantageous version, the guidance may be guidance in translation.

According to another preferred version of the invention, the element may comprise a recess enabling the part to be guided between the first and second positions.

In this instance the user merely has to push the blocking part to its first position For the rod to become immobilized, or to pull it for disassembly.

A further subject of the invention is a weapon, for example a piece of artillery, comprising an assembly according to the invention.

BRIEF DESCRIPTION OF THE DRAWINGS

Other characteristics and advantages of the invention will become apparent from the following description of preferred embodiments. In the appended drawings given by way of illustration and non-exhaustively, wherein.

DETAILED DESCRIPTION OF PREFERRED EMBODIMENTS

Figure 1:
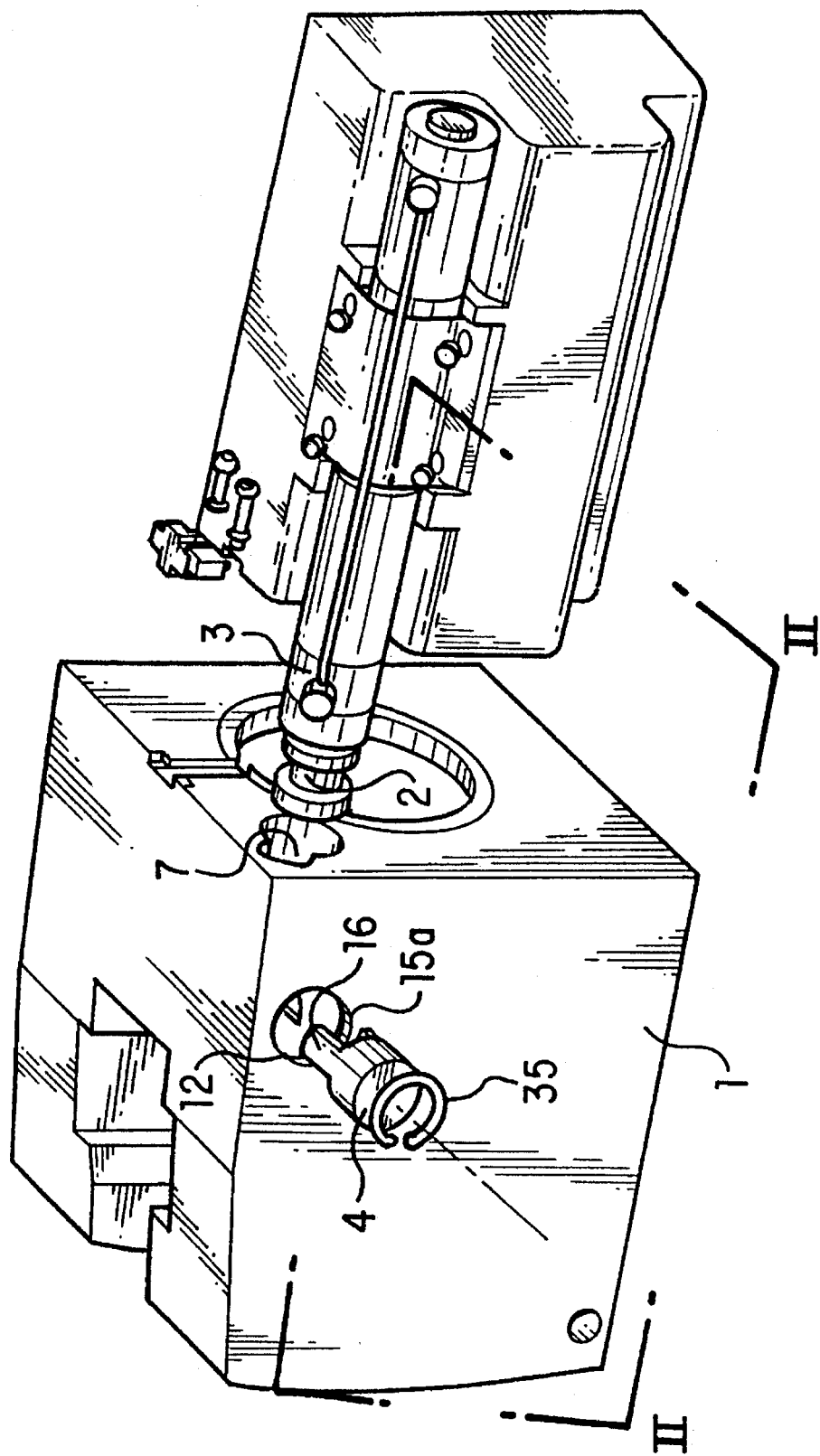
FIG. 1 is a perspective view of an embodiment of the assembly according to the invention comprised in a weapon.
Figure 2:
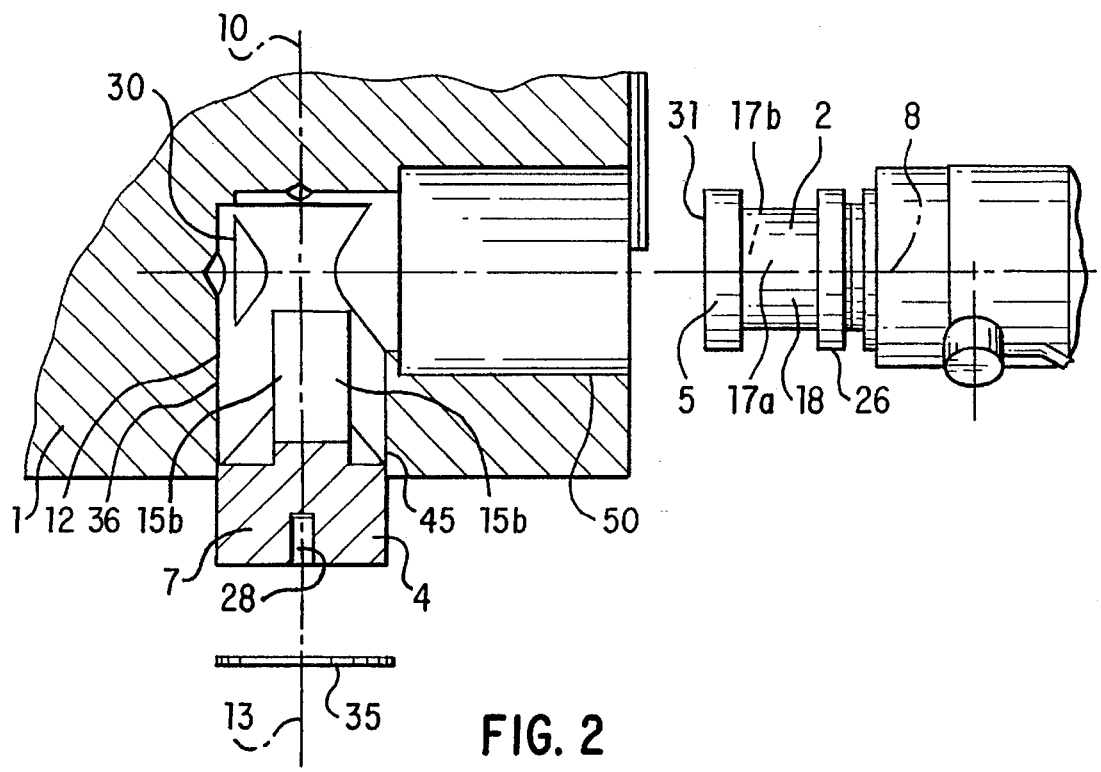
FIG. 2 is a cross-section according to plane II—II of FIG. 1.
Figure 3:
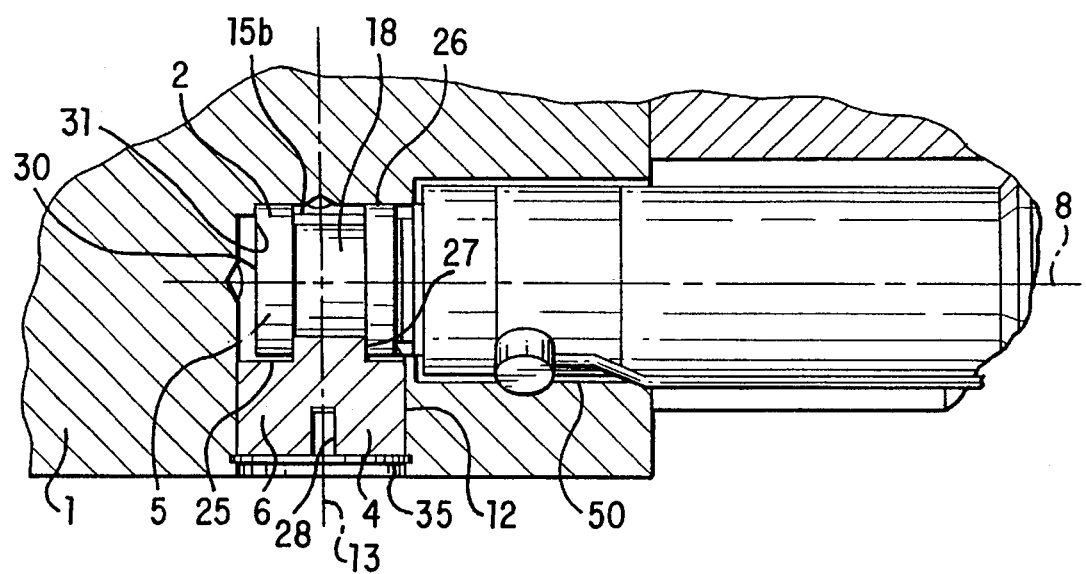
FIG. 3 is a similar view to FIG. 2 showing the assembly in the position whereby the rod is blocked.

FIGS. 1, 2 and 3 show an embodiment of the assembly according to the invention, mounted on a weapon, for example a conventional piece of artillery.

The assembly comprises an element 1, which in this case is the breech ring of the weapon, and a rod 2 that is mobile in axial translation along an axis 8 with respect to this breech ring 1. The rod 2 is a brake rod of the weapon. The brake in this case is a jack 3, as is well known. The rod 2 is therefore the rod of the jack 3. The rod 2 might also be the rod of a conventional recuperator.

Hereafter, only the relative character of the movement of the rod 2 with respect to the breech ring 1 will be considered.

The assembly also comprises a memorable blocking part 4 arranged to be associated with the breech ring 1 in a first position. In the first position 6 shown in FIG. 3, the blocking part 4 lies in the trajectory of a part 5 of the circumference of the rod 2 and prevents translation of the rod with respect to the breech ring 1.

In the present example, the rod 2 is partly mobile inside the breech ring 1 in a cylindrical channel 50 that is coaxial to the rod 2. Moreover, the part 5 lies inside the breech ring 1 when the blocking part 4 occupies the first position 6. When it occupies the first position 6, the blocking part 4 also lies generally inside the breech ring 1.

The assembly is arranged so that, as soon as the blocking part 4 occupies the first position 6, the assembly supports the blocking part 4 and prevents its movement under the action of the rod 2 of the breech ring 1.

Moreover, the assembly is in this case arranged so as to guide the blocking part with respect to the breech ring between the first position 6 and a second position 7, shown in FIG. 2, wherein the blocking part 4 may be easily put into position or removed by the user.

In this example, the part 4 is guided in a plane 10 that is substantially orthogonal to the axis 8 of the rod 2. The line of the plane 10 may be seen in FIG. 2 wherein the cutting plane is orthogonal to the plane 10. Moreover, the guidance is in this example is guidance in translation. For this reason, the breech ring 1 comprises a tubular recess 12 enabling the part 4 to be guided between the first 6 and second 7 positions. The axis of the recess is orthogonal to the axis 8 of the rod and is, in this example, horizontal. In the position 7, the part 4 partly outs out of the breech ring.

Figure 4:
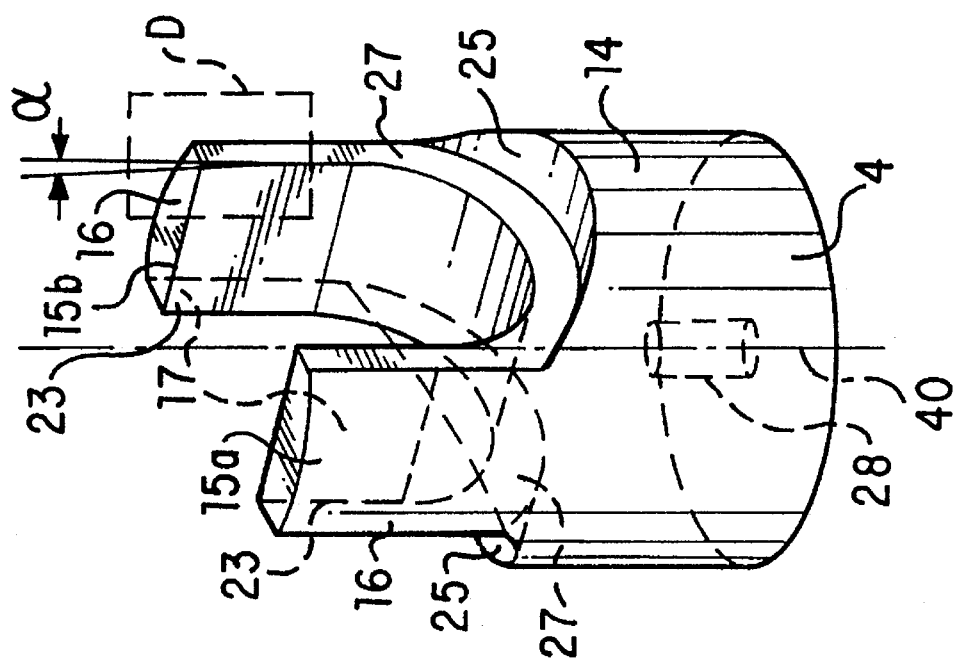
FIG. 4 is a perspective view of the blocking part.

In reference to FIG. 4, the part 4 comprises a tubular part 1 arranged to enable the part 4 to slide in the recess 12. The recess 12 and the tubular part 14 are, in this example, cylindrical. The size of the recess and the tubular part are designed to enable the part to glide smoothly in the recess 12.

Furthermore, the part 4 comprises two parallel tabs 15a, 15b extending substantially orthogonally to the rod 2 on each side of the axis 8 of the rod when the part 4 occupies the first position 6. The two tabs are symmetrical to one another with respect to a plane containing the axis 40 of the part 4.

The outer face 16 of the tabs 15a, 15b lies in the prolongation of the cylindrical part 14 such that the outer face 16 is geometrically supported by the cylinder of the cylindrical part 14.

The inner faces 17 of the tabs 15a, 15b are flat and are parallel to the plane defined by the axes 13 and 8 in position 6 of the part 4. The tabs 15a, 15b thereby constitute a U-shape at the end of the part 4, facing the axis 8 of the rod 2.

The circumference of the rod 2 comprises two notches 17a, 17b adjusted to accommodate, respectively, tabs 15a, 15b. The notches 17a, 17b in this example comprise part of a ring-shaped groove 18 on the circumference of the rod 2.

The tabs 15a, 15b engaged in the groove 18 in the first position 6 of the part 4, comprise an obstacle to the relative movement of the rod 2 with respect to the breech ring 1.

If need be, the assembly might comprise a single tab cooperating with a single notch.

Figure 5:
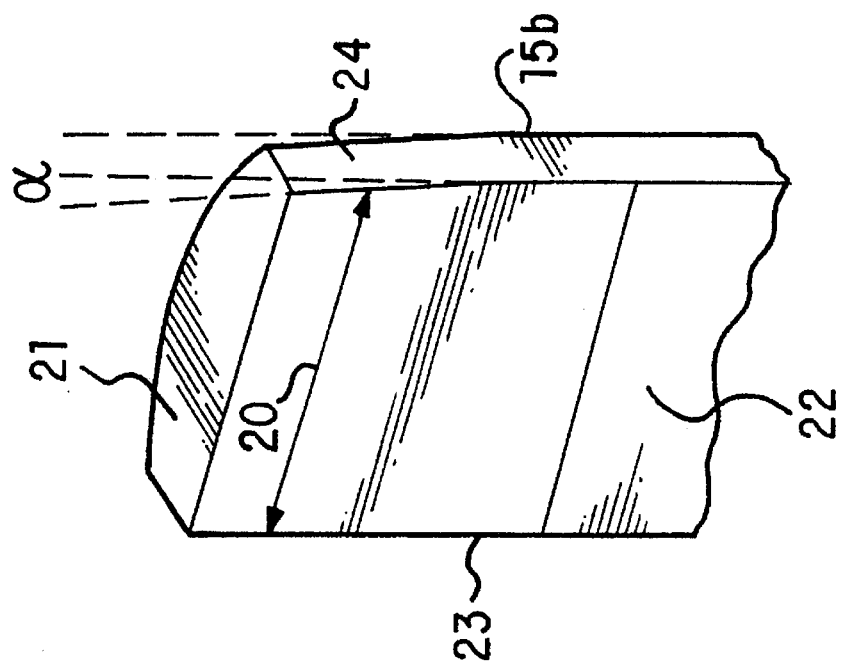
FIG. 5 is an enlarged view of the detail D of FIG. 4.

In reference to FIGS. 4 and 5, each tab 15a, 15b has, in parallel to the sense of the axis 8 of the rod 2, a narrowed part 20 in the sense of its tip 21 opposite the base 22 of the tab. Each tab 15a, 15b is therefore narrower at its tip 21 than at its base 22.

In reference to FIG. 5, a first edge 23 of each tab 15a, 15b is orthogonal to the axis 8 of the rod when the part 4 is in its first position 6 as seen in FIG. 4. The second edge 24 of each tab, opposite the first edge 23, is slightly inclined at an angle α towards the base 22 of the tab to form the narrowed part 20. The narrowed part is such that the tips of the tabs may easily penetrate between the rims of the groove 18 and that the tabs between the edge 23 and the base of the edge 24 fit tightly in the rims of the groove 18.

The end of the cylindrical part 14 located on the same side as the tabs is machined so as to have two faces 25 with a cylindrical sector having an axis orthogonal to the axis 40 of the cylindrical part 14 so as to mold the tops 26 of the rims of the groove 18, which also has a cylindrical sector. This end also has two faces 27 parallel to the plane 10 in the first position 6 of the part 4, designed to come into contact with the internal side rims of the groove 18 in the first position 6, which also help to block the rod 2. The faces 27 lie in the prolongation of the edges 23 and 24 of the tabs 15a, 15b.

In reference to FIGS. 2 and 3, the wall 36 of the recess 12 has a cavity 45 arranged to allow the installation of a stopping organ 35 opposing the movement of the part 4 out of the first position 6. In this example, the cavity 45 is a ring-shaped transverse groove adjusted to accommodate the stopping organ that, for example, is a rubber band 35 conventionally used in other applications. The band 35 juts out into the recess 12 when it is put into place in the groove 26 thereby blocking the part 4 from moving out.

A screw (not shown) is inserted into the axial opening 28 of the cylindrical part 14 opposite the tabs 15a, 15b.

In the blocked position of the rod 2, the end 31 of the rod is in contact with the stop surface 30 of the breech ring, which is orthogonal to the axis 8.

The assembly is employed as follows.

To block the rod 2, the weapon is maneuvered so as to bring the rod 2 into the channel 50 until the end 31 of the rod 2 comes into contact with the stopping face 30 of the breech ring.

The user thereafter takes hold of the blocking part 4 and places it in the second position 7 with the tabs in a vertical position with respect to one another, then the user pushes the part into the recess 12 of the breech block. Guided in this recess, the part 4 reaches its first position 6. During this movement, the tabs 15a, 15b gradually engage between the rims of the groove 18, easily at first because of the narrowed part 30 then with a tighter fit against the rims of the groove 18 at the end of the course of movement of the blocking part 4, the faces 27 of the part 4 also coming into contact with the rims of the groove 18 and helping to create a tight fit.

The rubber band 35 is thereafter placed in the groove 26 to prevent the blocking part 4 from coming out. Here the intention is not to block the part 4 against the movement of the rod 2, but to prevent the part 4 from accidentally coming out of position in the event of a shock to the weapon or its being tilted.

The position 6 of the blocking part 4 in the breech ring 1 is such that any translation of the rod is prevented, given that the tabs 15a, 15b are engaged in the groove 18, as soon as the blocking part 4 occupies the first position 6 wherein it is supported by the breech ring 1. The transfer of the translation strain between the rod 2 and the breech ring 1 is carried out by means of the tabs 15a, 15b and the cylindrical part 14.

To unblock the rod, the user removes the band 35, pulls the part 4 in the recess 12 using the afore-mentioned screw and then pulls it out of the breech ring 1.

The rod may therefore be blocked and unblocked very quickly and very easily. The narrowed part 20 of the tabs enables the part 4 to be quickly put into its first position 6 while efficiently blocking the rod 2 by gripping it between the part 4 and the breech ring 1.

Naturally, many modifications and improvements may be brought to the invention without leaving its scope.

We claim:

1. An assembly, comprising:
   an element;
   a rod that is mobile in axial translation with respect to the element; and
   a removable blocking part arranged to be associated with the element in a first position in which the blocking part forms a positive lock with the rod thereby preventing translation of the rod, the rod and the blocking part establishing a friction lock when the blocking part occupies the first position, wherein the blocking part comprises at least one tab extending substantially orthogonally to the rod when the blocking part occupies the first position and the circumference of the rod comprises at least one notch arranged to accommodate the at least one tab, the at least one tab having a narrowed part defining a tip opposite a base of the at least one tab such that a first edge of the at least one tab is orthogonal to the rod when the blocking part is in the first position and a second edge opposite the first edge is slightly inclined toward the base of the tab to form the narrowed part.

2. An assembly according to claim 1, further comprising means for guiding the blocking part with respect to the element between the first position and a second position, wherein the blocking part is placeable into and removable from the element.

3. An assembly according to claim 2, wherein the guiding means guides the blocking part in a plane that is substantially orthogonal to an axis of the rod.

4. An assembly according to claim 3, wherein the guiding means guides the blocking part in translation.

5. An assembly according to claim 2, wherein the guiding means comprises a recess enabling the blocking part to be guided between the first and second positions.

6. An assembly according to claim 5, wherein the recess is tubular.

7. An assembly according to claim 6, wherein the blocking part comprises a tubular part arranged to enable the blocking part to slide in the recess.

8. An assembly according to claim 7, wherein the recess and the tubular part are cylindrical.

9. An assembly according to claim 5, wherein the recess includes a wall having a cavity arranged to allow a stopping organ to be inserted in the cavity to prevent movement of the blocking part from the first position.

10. An assembly according to claim 1, wherein the rod is at least partially mobile inside the element, the rod portion being inside the element when the blocking part occupies the first position.

11. An assembly according to claim 10, wherein the blocking part lies substantially inside the element when the blocking part occupies the first position.

12. An assembly according to claim 11, further comprising a jack for reciprocating the rod.

13. An assembly according to claim 1, wherein the rod comprises a rod of a brake or a recuperator of a weapon.

14. An assembly, comprising:
    an element;
    a rod that is mobile in axial translation with respect to the element;
    a removable blocking part arranged to be associated with the element in a first position in which the blocking part forms a positive lock with the rod thereby preventing translation of the rod, wherein the rod and the blocking part establish a friction lock when the blocking part occupies the first position; and
    means for guiding the blocking part with respect to the element between the first position and a second position, the guiding means including a recess enabling the blocking part to be guided between the first and second positions, the recess including a wall having a cavity arranged to allow a stopping organ to be inserted in the cavity to prevent movement of the blocking part from the first position.

15. An assembly according to claim 14, wherein the blocking part comprises at least one tab extending substantially orthogonally to the rod when the blocking part occupies the first position, the circumference of the rod comprising at least one notch arranged to accommodate the at least one tab.

16. An assembly according to claim 15, wherein the at least one tab has a narrowed part defining a tip opposite a base of the at least one tab.

17. An assembly according to claim 16, wherein a first edge of the at least one tab is orthogonal to the rod when the blocking part is in the first position, and wherein a second edge opposite the first edge is slightly inclined toward the base of the tab to form the narrowed part.

18. A weapon including an assembly, comprising:
    a breech ring;
    a rod that is mobile in axial translation with respect to the breech ring; and
    a removable blocking part arranged to be associated with the breech ring in a first position in which the blocking part forms a positive lock with the rod thereby preventing translation of the rod, the rod and the blocking part forming a friction lock to prevent movement of the blocking part when the blocking part occupies the first position, wherein the blocking part comprises at least one tab extending substantially orthogonally to the rod when the blocking part occupies the first position and the circumference of the rod comprises at least one notch arranged to accommodate the at least one tab, the at least one tab having a narrowed part defining a tip opposite a base of the at least one tab such that a first edge of the at least one tab is orthogonal to the rod when the blocking part is in the first position and a second edge opposite the first edge is slightly inclined toward the base of the tab to form the narrowed part.

19. The assembly according to claim 18, wherein the blocking part comprises two parallel tabs that extend on each side of the rod in the first position, the rod comprising notches for receiving the tabs.

20. An assembly according to claim 19, wherein each of said notches comprises part of a ring-shaped groove on the rod.

21. A weapon including an assembly, comprising:

a breech ring;

a rod that is mobile in axial translation with respect to the breech ring; and a removable blocking part arranged to be associated with the breech ring in a first position in which the blocking part forms a positive lock with the rod thereby preventing translation of the rod; and means for guiding the blocking part with respect to the breech ring between the first position and a second position, the guiding means including a recess enabling the blocking part to be guided between the first and second positions, the recess including a wall having a cavity arranged to allow a stopping organ to be inserted in the cavity to prevent movement of the blocking part from the first position.

* * * * *